Aug. 16, 1932.  B. T. HORSFIELD  1,871,793
PURIFIED METALLIC OXIDE
Original Filed March 2, 1925
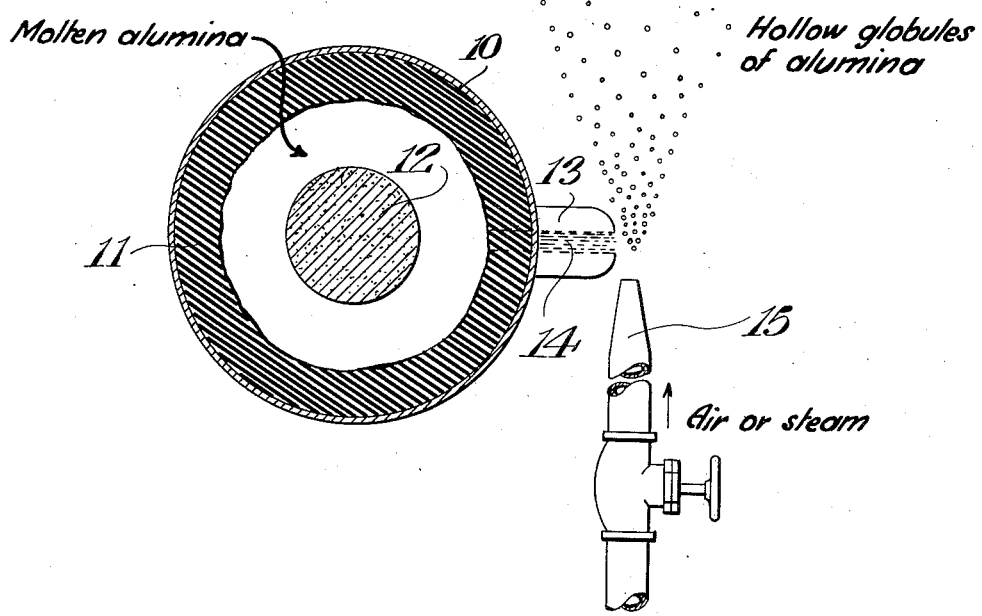
Inventor
Basil T. Horsfield.
By his Attorneys
Cooper, Kerr & Dunham Patented Aug. 16, 1932

1,871,793

UNITED STATES PATENT OFFICE

BASIL T. HORSFIELD, OF BADIN, NORTH CAROLINA, ASSIGNOR TO ALUMINUM COMPANY OF AMERICA, OF PITTSBURGH, PENNSYLVANIA, A CORPORATION OF PENNSYLVANIA

PURIFIED METALLIC OXIDE

Original application filed March 2, 1925, Serial No. 12,617. Divided and this application filed June 25, 1927. Serial No. 201,366.

The invention which forms the subject of my present application (a division of my copending application Serial No. 12,617, filed March 2, 1925) relates to metallic oxides, especially oxides of high melting point, and its chief object is to provide such oxides in a state free from carbon and otherwise substantially pure. To this and other ends the invention comprises the novel product hereinafter described. At the present time one of the most important applications of the invention is in the field of aluminum production and accordingly the preferred practice will be described as employed for producing pure alumina, suitable for use in the well known Hall process of electrolytic reduction. A like procdure may be followed for the treatment of other oxides, for example magnesia, and oxide mixtures, as for example mixtures containing lime, magnesia, and alumina.

In the preparation of alumina for the process just mentioned, by electrothermal treatment of aluminous material, such as bauxite, with a reducing agent to reduce the impurities which are more reducible than alumina, great difficulty has been experienced in eliminating or diminishing to a sufficiently low proportion the oxides of iron and titanium found in the crude material.

It has been found in practice that if the fused bauxite or other aluminous material is treated with enough carbon to raise the dissolved carbon content thereof to about 1 per cent it is possible to throw out enough of the titanium to leave only about 0.2 per cent, or less, of TiO$_2$ in the finished product, but I have also observed that this procedure usually leaves a relatively large amount of iron oxide, ranging in general from about 0.6 per cent to about 0.9 per cent, together with a small amount of silica, usually less than 0.3 per cent.

I have found that if molten substantially pure alumina, say alumina produced as just described, is tapped from the furnace or other receptacle and while still fluid is subjected to a powerful blast of air, steam or other suitable gas, the stream of molten alumina will be broken up and converted into small hollow globules more or less spherical in shape Examining these globules after cooling I find that not only has substantially all the carbon been burned out, so that they present in general an almost snow-white appearance, but also a considerable portion of the iron oxide has been eliminated, probably by volatilization resulting from the large surface exposed by the globules to the air or other gas, which becomes highly heated by contact with the molten material.

A simple form of apparatus for practicing my process is illustrated diagrammatically in the accompanying drawing, in which 10 represents an electric furnace in horizontal section, having a refractory lining 11 of any suitable character, a carbon electrode 12, and a tapping spout 13. The crude bauxite, clay, or other aluminous material is fused in the furnace in admixture with a carbonaceous reducing agent, say by the process described in the United States patents of Charles M. Hall, Nos. 677,207; 677,208; 677,209; and 706,553, or in the United States Patent of William Hoopes, Francis C. Frary and Junius D. Edwards, No. 1,534,316, issued April 21, 1925; preferably with enough carbon to give the purified alumina a dissolved carbon content of about 1 per cent. The iron, titanium and silicon resulting from the reduction of their oxides collect in the bottom of the furnace as ferro-silicon, on which the unreduced alumina floats as a molten slag.

As the stream of alumina 14 issues from the tapping spout it meets the blast from the nozzle 15 and is blown into fragments, which upon examination are found to be hollow globules, ranging in size from very fine sand to one-eighth or three-sixteenths of an inch (about 3 or 5 mm.) or more, in diameter, with walls which do not as a rule exceed one one-hundredth of an inch in thickness and are in most cases much thinner. In general the higher the velocity of the blast the finer the globules, and I have observed that if the velocity is too low the larger globules may not be as completely oxidized as when a higher velocity is used, and may contain larger amounts of iron. Such larger granules are black in color and may be from one-fourth to one-half inch in diameter, and although hollow like the smaller ones they are apt to be quite irregular in shape. While I have successfully used air and steam at pressures ranging from fifty to one hundred and fifty pounds per square inch, the higher pressures are preferred as being less likely to produce insufficiently oxidized granules, especially when the stream of molten alumina is unduly viscous. I also prefer to have the temperature of the alumina well above the melting point, primarily to insure adequate fluidity of the stream. In making a carbon-free product from alumina containing excess carbon this superheating is desirable for the reason that it facilitates the oxidation of the carbon, both by the gas used for the blast (where, as is preferred, an oxidizing gas, as for example air or steam, is employed) and also by the air into which the alumina is blown.

It is well known that in blowing blast furnace slag there is produced a fibrous material commercially known as "slag wool", together with a large amount of small glassy pellets. This seems to be due to the property of silicate slags by virtue of which they pass through a pasty stage in cooling from the liquid to the solid state, so that as they are cooled in the air blast they are drawn out into the threads characteristic of slag wool. I believe this condition is characteristic of the silicates and not of pure high-melting oxides which are substantially free from silica, and as a matter of fact I have been able to produce like phenomena with molten aluminum oxide by adding about 5 per cent of silica. If, therefore, it is desired to avoid all production of thread-like forms the material to be treated should be substantially free from silica and should contain only substances which crystallize directly when their temperature is reduced to or below the freezing point. Where it is necessary or desirable to remove silica from the oxide any convenient method for the purpose can be employed, as for example by treatment of the bauxite or other aluminous material with a carbonaceous reducing agent at a suitable temperature in the presence of iron to reduce silica and cause the resulting silicon to alloy with the iron.

My process affords a simple, economical and effective way of eliminating from alumina the excess carbon which, as stated above, must usually be employed in the electro-thermal purification of the crude material to diminish the content of other oxides to a low figure. This is considered to be one of the most important advantages of the process. Another important advantage is found in the low cost of reducing the product to a state of such fine subdivision that when added to the molten cryolite bath of the Hall aluminum process for reduction to metallic aluminum by electrolysis the particles dissolve before they sink to the bottom of the electrolyte cell, as more particularly described in the United States patent of Francis C. Frary, No. 1,534,031, issued April 21, 1925. This lessened cost is due to the fact that crushing and rough grinding is unnecessary, the globular alumina being charged directly into the ball mill or other fine-grinding apparatus. I have observed, however, that the blast-granulated alumina is notably tougher, and harder to grind in a ball mill, than is alumina slag which has solidified in the normal manner, and for this reason my product has superior properties as an abrasive. Another advantage of my product as an abrasive is its uniform and fine grain-size, i. e., its crystal size. Alumina solidified from the molten state in the usual way has in general a much coarser and less uniform structure, and I believe that the fine grain of my material is due to its very rapid in fact practically instantaneous solidification.

In the manufacture of abrasives by fusion of alumina in the electric furnace the importance of having the final product completely free from carbon has made it necessary to add to the molten alumina, or leave unreduced therein, a substantial amount of some oxide which is easily reducible, such as iron oxide. This means that the prior products must contain a substantial amount of carbon or of reducible oxide, either of which is disadvantageous in the abrasive. By my process, however, I am able to produce alumina from which other oxides have been removed as far as it is possible to do so by the use of excess carbon but which nevertheless is sensibly free from carbon.

The hollow globular particles of alumina are crystalline and of course discrete, as are also the particles resulting when the alumina is further disintegrated by breaking up the globules.

I claim—

1. As a new product, metallic oxide of the class which solidify directly from the molten state without passing through a pasty stage, in the form of hollow globules.

2. As a new product, metallic oxide of the class which solidify directly from the molten state without passing through a pasty stage, of high melting point, in the form of hollow globules.

3. As a new product, aluminum oxide in the form of hollow globules.

4. As a new product, metallic oxide of the class which solidify directly from the molten state without passing through a pasty stage, substantially free from silica, in the form of hollow globules.

5. As a new product, aluminum oxide in the form of hollow globules and having a fine-grained structure.

6. As a new product, substantially pure aluminum oxide in the form of small thin-walled hollow bodies having the fine-grained structure characteristic of instantaneous solidification.

7. As a new product, aluminum oxide, substantially pure and sensibly free from carbon, in the form of small hollow bodies of globular shape having walls which are in general not more than about 0.01 of an inch thick.

8. As a new product, aluminum oxide, substantially free from silica and sensibly free from carbon, in the form of small hollow bodies of globular shape having walls which are in general not more than about 0.01 of an inch thick.

9. As a new product alumina for use in electrolysis comprising discrete crystalline particles of small size.

10. As a new product alumina for use in electrolysis comprising discrete crystalline particles about 3 mm. in size.

11. As a new product alumina for use in making aluminum by electrolysis, in the form of small hollow balls, the walls of which are composed of crystals of not more than about 0.01 inch in size.

In testimony whereof I hereto affix my signature.

BASIL T. HORSFIELD.